(12) United States Patent
Jaenicke et al.

(10) Patent No.: US 10,096,443 B2
(45) Date of Patent: Oct. 9, 2018

(54) DIRECT-CURRENT SWITCHING DEVICE

(71) Applicant: SIEMENS AKTIENGESELLSCHAFT, Munich (DE)

(72) Inventors: Lutz-Ruediger Jaenicke, Mahlow (DE); Joerg Teichmann, Dallgow-Doeberitz (DE); Jan Weisker, Brieselang (DE)

(73) Assignee: Siemens Aktiengesellschaft, Munich (DE)

( * ) Notice: Subject to any disclaimer, the term of this patent is extended or adjusted under 35 U.S.C. 154(b) by 269 days.

(21) Appl. No.: 14/904,185

(22) PCT Filed: Jul. 2, 2014

(86) PCT No.: PCT/EP2014/064085
§ 371 (c)(1),
(2) Date: Jan. 11, 2016

(87) PCT Pub. No.: WO2015/003974
PCT Pub. Date: Jan. 15, 2015

(65) Prior Publication Data
US 2016/0155587 A1     Jun. 2, 2016

(30) Foreign Application Priority Data

Jul. 11, 2013   (DE) .................. 10 2013 213 602

(51) Int. Cl.
*H01H 33/59*     (2006.01)
(52) U.S. Cl.
CPC ............... *H01H 33/596* (2013.01)

(58) Field of Classification Search
CPC ....................................... H01H 33/596
See application file for complete search history.

(56) References Cited

U.S. PATENT DOCUMENTS

| 4,159,498 A | 6/1979 | Noeske |
| 4,216,513 A | 8/1980 | Tokuyama et al. |
| 4,434,332 A | 2/1984 | Yanabu et al. |

(Continued)

FOREIGN PATENT DOCUMENTS

| CN | 101814392 A | 8/2010 |
| EP | 0092205 A2 | 10/1983 |

(Continued)

*Primary Examiner* — Jeffrey Shin
(74) *Attorney, Agent, or Firm* — Laurence Greenberg; Werner Stemer; Ralph Locher

(57) ABSTRACT

A direct-current switching device switches direct currents, in particular direct currents in the kiloampere range. The switching device contains a switching unit, a resonant circuit, and an overvoltage arrester. During the switching off of the switching unit, the resonant circuit produces an oscillating resonant current, which is superposed with the direct current still flowing through the switching unit during the switching off of the switching unit. Accordingly, connected in series with the switching unit, hereinafter referred to as the first switching unit, is a second switching unit, the switching behavior of which differs from the switching behavior of the first switching unit, and the resonant circuit and the arrester lie electrically in parallel with the series connection.

13 Claims, 3 Drawing Sheets

(56) References Cited

U.S. PATENT DOCUMENTS

| | | | |
|---|---|---|---|
| 4,538,039 A | 8/1985 | Gotoh et al. | |
| 2010/0208392 A1 | 8/2010 | Munakata et al. | |
| 2013/0020881 A1* | 1/2013 | Panousis | H01H 33/596 307/113 |

FOREIGN PATENT DOCUMENTS

| | | |
|---|---|---|
| EP | 2221845 B1 | 4/2012 |
| EP | 2523204 A1 | 11/2012 |
| WO | 2009149749 A1 | 12/2009 |

\* cited by examiner

DIRECT-CURRENT SWITCHING DEVICE

BACKGROUND OF THE INVENTION

Field of the Invention

The invention relates to a direct-current switching device for switching direct currents, in particular direct currents in the kiloampere range, with the features according to the preamble of the main claim.

A direct-current switching device of this type is known from European patent document EP 2 221 845 B1. This direct-current switching device comprises a switching unit, a resonant circuit and an overvoltage arrester. When the switching unit is switched off, the resonant circuit generates an oscillating resonant current which is superposed on the direct current still flowing through the switching unit during the switching off, with the formation of an oscillating superposition current. The superposition current is switched off at a zero transition. A control device is provided to control excitation of the resonant circuit.

BRIEF SUMMARY OF THE INVENTION

The invention is based on the object of providing a direct-current switching device that permits a particularly simple construction and a particularly fast switching off of the direct current.

This object is achieved according to the invention by a direct-current switching device with the features according to the main claim. Advantageous embodiments of the direct-current switching device according to the invention are given in the subsidiary claims.

It is thus provided according to the invention that, connected in series with the switching unit, referred to below as the first switching unit, there is a second switching unit whose switching behavior differs from that of the first switching unit, and whose resonant circuit and arrester are electrically parallel to this series circuit.

A substantive advantage of the direct-current switching device according to the invention can be seen in that, due to the difference between the switching behaviors of the switching units, work can be shared in that the first switching unit excites the resonant circuit to full oscillation, and the second switching unit switches off the resulting superposition current at a zero transition. In other words, one of the switching units is specifically used for the excitation of the resonant circuit, and the other switching unit is specifically used for switching the superposition current off.

A further substantive advantage of the direct-current switching device according to the invention can be seen in that a separate control device, as is present in the previously known direct-current switching device for driving the resonant circuit, is not required.

A difference in the switching behavior of the first and second switching units can be achieved in a particularly simple and thus advantageous manner if it is based on different physical effects in switching chambers of the switching units.

In order to achieve a particularly fast excitation of the resonant circuit by the first switching unit, it is considered advantageous if the first switching unit generates a larger arc voltage when the direct current is switched off than does the second switching unit.

Insulating gas switching units, for example, exhibit relatively high arc voltages, so that it is considered advantageous if the first switching unit is an insulating gas switching unit.

Preferably the first switching unit contains $SF_6$ or a gas mixture containing $SF_6$ as the insulating gas.

In terms of the second switching unit, it is considered advantageous if this is designed in such a way that it can switch currents with a steeper current gradient at the zero transition than can the first switching unit. As already explained, the second switching unit is preferably used to switch off the current flowing through the series circuit of the two switching units.

Switches with the property of being able to securely switch currents even with a steep current gradient at the zero transition are, for example, vacuum switching units, so that it is considered advantageous if the second switching unit is a vacuum switching unit.

It is particularly advantageous if the different switching behavior of the two switching units is based on different gas contents (differing, for example, in respect of the gas pressure and/or gas composition) in the switching chambers of the switching units. Accordingly it is considered particularly advantageous if the first switching unit is an insulating gas switching unit and the second switching unit is a vacuum switching unit.

A common drive can be provided to drive the two switching units.

A different switching behavior of the two switching units can also moreover be achieved in that the two switching units are opened with an offset in time. Accordingly in one particularly advantageous embodiment of the direct-current switching device it is provided that it comprises a delay device which, when the direct current is switched off, opens the second switching unit at a time after the first switching unit.

Such a delay device can, for example, comprise a gearing mechanism or be formed of a gearing mechanism which is connected between the second switching unit and the drive of the direct-current switching device that drives both switching units.

Alternatively or in addition, the delay device can be based on a snap-action spring mechanism that is connected between the second switching unit and the drive and which is tightened during or after the first switching unit is switched off and is released to switch off the second switching unit.

With respect to the duration of the delay of the delay device, it is considered advantageous if the duration of the delay and the natural frequency of the resonant circuit are matched to one another such that the switching off of the second switching unit does not start until the amplitude of the oscillating resonant current has a value of at least 75% of the direct current that is to be switched off, and/or until after a period of time that is at least three times the natural frequency of the resonant circuit. The moment in time of the separation of the switch contacts of the respective switching unit is here deemed to be the moment in time of switching off.

The invention moreover relates to a method for switching off a direct current, in particular a direct current in the kiloampere range, in which a switching unit is switched off and an arc is generated, a resonant circuit is excited by the arc voltage occurring at the arc, and an oscillating resonant current is generated which is superposed on the direct current still flowing through the first switching unit during the switching off, forming a superposition current and the superposition current is switched off at a zero transition of the superposition current and the energy stored in the resonant circuit is dissipated by an arrester.

In respect of such a method it is provided according to the invention that connected in series with the switching unit, referred to below as the first switching unit, there is a second switching unit whose switching behavior differs from that of the first switching unit, and that the superposition current that is flowing through the series circuit of the two switching units is switched off at a zero transition by the second switching unit.

In respect of the advantages of the method according to the invention, we refer to the above presentations in connection with the direct-current switching device according to the invention, since the advantages of the direct-current switching device according to the invention correspond to those of the method according to the invention.

In order to achieve a particularly fast switching off of high direct currents, it is considered advantageous if the first switching unit generates a larger arc voltage when the direct current is switched off than does the second switching unit, and the second switching unit can switch oscillating currents with a steeper current gradient at the zero transition than can the first switching unit.

Preferably, the switching behaviors of the first and second switching units during the switching off are based on different physical effects in switching chambers of the switching units.

Alternatively or in addition, it can be provided that the different switching behaviors of the two switching units is based on the second switching unit being opened with a delay after the first switching unit.

With respect to the delay, it is considered advantageous if the switching off of the second switching unit does not start until the amplitude of the oscillating resonant current has a value of at least 75% of the direct current that is to be switched off, and/or until after a period of time that is at least three times the natural frequency of the resonant circuit.

In order to ensure that the second switching unit switches off quickly after the resonant circuit has been excited by the first switching unit, it is considered particularly advantageous if a snap-action spring mechanism is tightened during or after the switching off of the first switching unit, and the second switching unit is switched off in that the tightened snap-action spring mechanism is released.

BRIEF DESCRIPTION OF THE SEVERAL VIEWS OF THE DRAWING

The invention is explained in more detail below with reference to exemplary embodiments; here, by way of example.

DESCRIPTION OF THE INVENTION

For the sake of clarity, the same reference signs have always been used for identical or comparable components in the figures.

Figure 1:
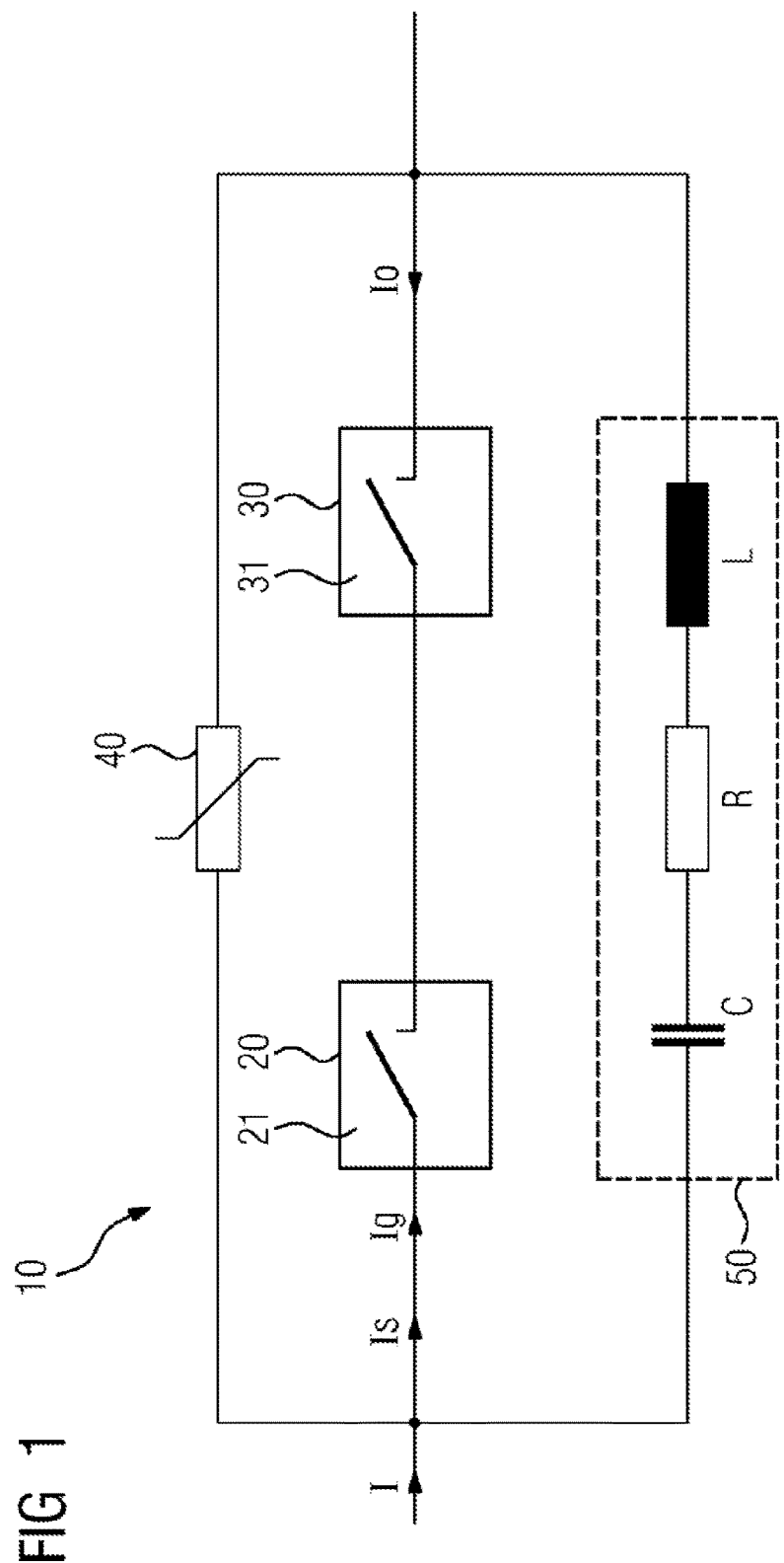
FIG. 1 shows an exemplary embodiment of a direct-current switching device according to the invention, in which the different switching behavior of a pair of switching units is based on different physical effects in the switching chambers of the switching units.

FIG. 1 shows an exemplary embodiment of a direct-current switching device 10, in which a first switching unit 20 and a second switching unit 30 are connected in series. An overvoltage arrester 40 and a resonant circuit 50 are connected in parallel with the series connection of the first switching unit 20 and the second switching unit 30.

The resonant circuit 50 can, for example, be formed of a capacitor C, a resistor R, and an inductance L.

In the exemplary embodiment according to FIG. 1, the two switching units 20 and 30 are opened simultaneously, at least approximately simultaneously, in order to switch off a direct current I, in particular a direct current in the kiloampere range. The two switching units 20 and 30 can be opened by individual drives, not shown in FIG. 1, which are associated individually with the respective switching unit.

The first switching unit 20 and the second switching unit 30 are different from the point of view of their switching behavior, the different switching behavior when switching off being based on different physical effects in the switching chambers 21 and 31 of the two switching units 20 and 30.

The assumption is made by way of example in what follows that the first switching unit 20 is an insulating gas switching unit whose switching chamber 21 is filled with $SF_6$ insulating gas or with an insulating gas mixture containing $SF_6$, and that the second switching unit 30 is a vacuum switching unit.

As a result of the presence of the insulating gas in the switching chamber 21 of the first switching unit 20, the first switching unit 20 will generate a higher arc voltage when switching off the direct current I than will the second switching unit 30 in which no insulating gas, but rather a vacuum, is present in the switching chamber 31. The arc voltage dropped across the first switching unit 20 leads to a relatively fast excitation of the resonant circuit 50, so that this will generate an oscillating resonant current Io and inject it into the series circuit of the two switching units 20 and 30. The oscillating resonant current Io is superposed on the direct current Is flowing through the series circuit during the switching off process, whereby a superposition current Ig is formed.

As soon as the superposition current Ig undergoes a zero transition as a result of the influence of the oscillating resonant current Io, the second switching unit 30 will switch off the superposition current Ig. The second switching unit will be able to perform such a switching off process without difficulty, because, as a result of the vacuum in the switching chamber 31 in contrast to the first switching unit 20, it is particularly well suited to switching off even currents with a particularly steep current gradient at a zero transition.

In summary, the first switching unit 20 thus serves to excite the resonant circuit 50 as quickly as possible in order to inject an oscillating resonant current Io into the series circuit of the first switching unit 20 and the second switching unit 30, and the second switching unit 30 serves to switch off the superposition current Ig formed by the superposition of the oscillating resonant current Io at a zero transition in spite of the steep current gradient.

Figure 2:
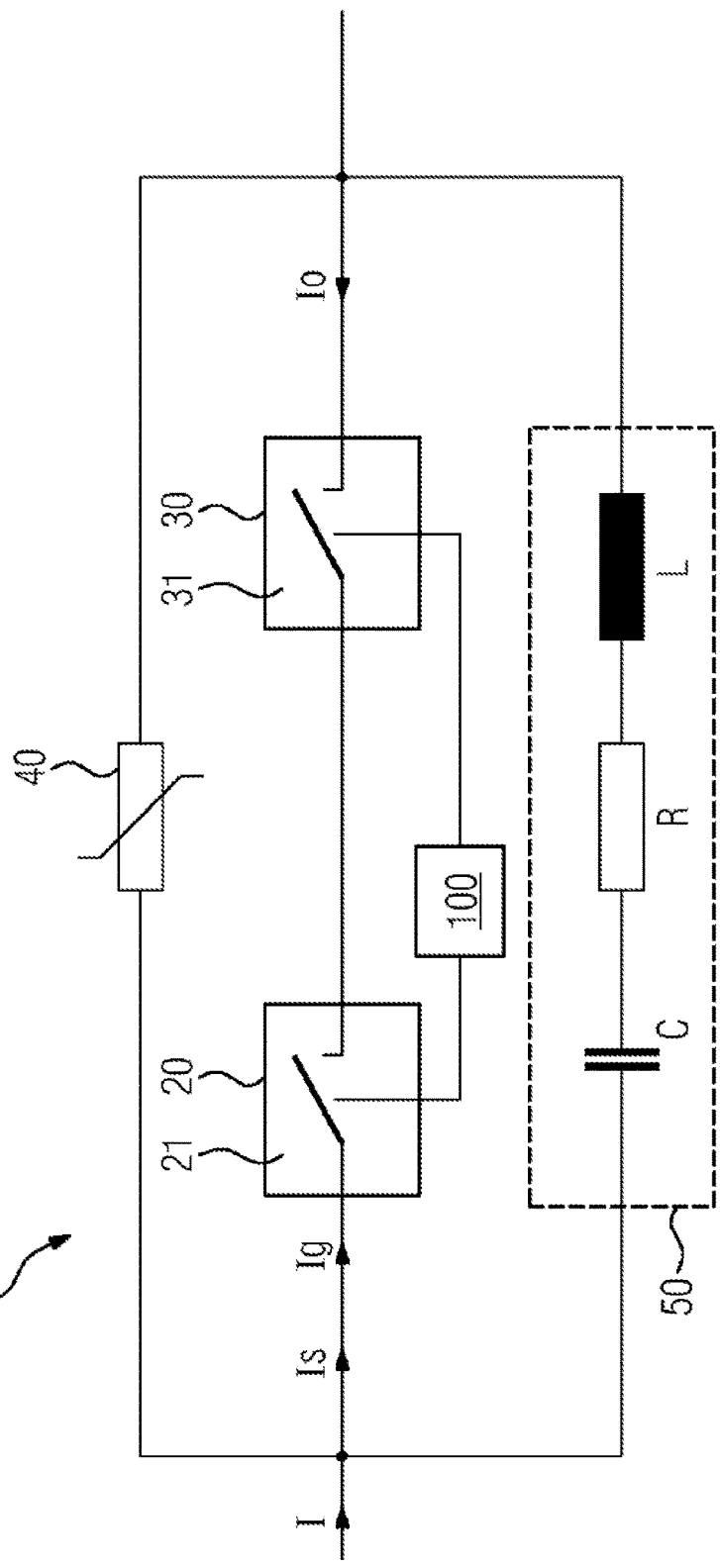
FIG. 2 shows an exemplary embodiment of a direct-current switching device according to the invention in which the two switching units are driven by a common drive.

FIG. 2 shows an exemplary embodiment of a direct-current switching device whose construction corresponds largely to the direct-current switching device according to FIG. 1. The direct-current switching device 10 according to FIG. 2 also comprises a first switching unit 20 in the form of an insulating gas switching unit and a second switching unit 30 in the form of a vacuum switching unit. In contrast to the exemplary embodiment according to FIG. 1, the two switching units 20 and 30 are switched on or off by a common drive 100.

In the exemplary embodiment according to FIG. 2, the switching off of a direct current I by the two switching units 20 and 30 by the drive 100 is preferably performed simultaneously, at least approximately simultaneously. In terms of the mode of operation of the direct-current switching device 10 according to FIG. 2, we refer to the above explanations in connection with the direct-current switching device 10 according to FIG. 1, which apply correspondingly here.

Figure 3:
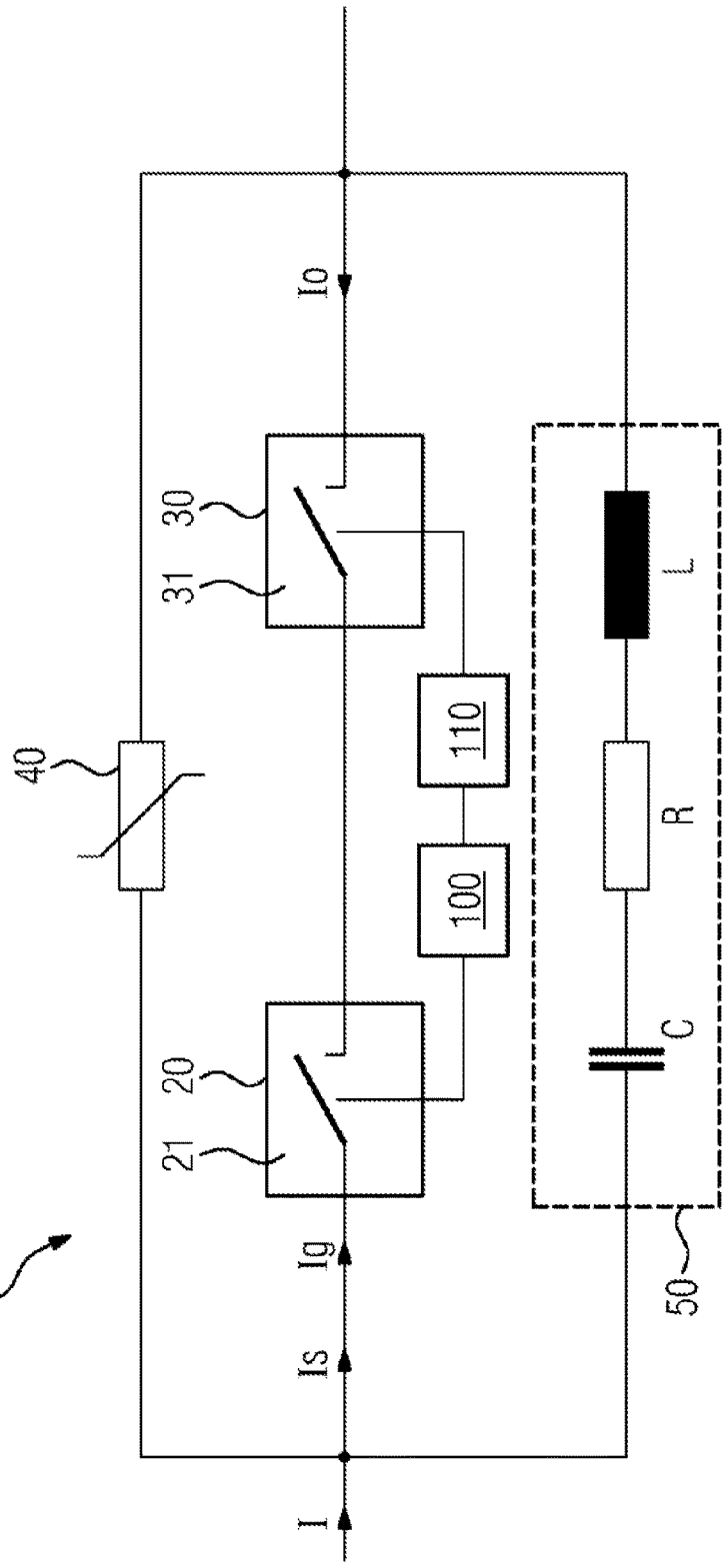
FIG. 3 shows an exemplary embodiment of a direct-current switching device according to the invention in which a delay device is present which opens the first switching unit before the second switching unit when switching off the direct current.

FIG. 3 shows an exemplary embodiment of a direct-current switching device 10 in which the first switching unit 20 is preferably formed by an insulating gas switching unit and the second switching unit 30 by a vacuum switching unit. A drive 100 serves to switch the two switching units 20 and 30 on or off.

In contrast to the exemplary embodiment according to FIG. 2, an additional delay device 110 is present in the direct-current switching device 10 according to FIG. 3 and only opens the second switching unit 30 after the first switching unit 20 when switching off the direct current I.

The delay device 110 can comprise a gearing mechanism or be formed of a gearing mechanism that is connected between the second switching unit 30 and the drive 100. Preferably the delay device comprises a snap-action spring mechanism that is tightened during or after the switching off of the first switching unit 20, and is released to switch off the second switching unit 30.

The switching off of the second switching unit 30 preferably only begins when the amplitude of the oscillating resonant current Io has a value of at least 75% of the direct current I that is to be switched off and/or only after a period of time that is at least three times the natural frequency of the resonant circuit 50.

The delayed switching off of the second switching unit 30 supports the fact that the arc that occurs at the first switching unit 20 as it is switched off gives rise to an arc voltage with which the resonant circuit 50 is excited particularly quickly. The second switching unit 30 is only switched off when, as a result of the oscillating resonant current Io, it is ensured that a zero transition that allows the second switching unit 30 to switch off can in fact occur.

Although the invention has in detail been illustrated and described more closely through preferred exemplary embodiments, the invention is not restricted by the disclosed examples, and other variations can be derived from this by the expert without going beyond the scope of protection of the invention.

LIST OF REFERENCE SIGNS

10 Direct-current switching device
20 First switching unit
21 Switching chamber
30 Second switching unit
31 Switching chamber
40 Overvoltage arrester
50 Resonant circuit
100 Drive
110 Delay device
C Capacitor
I Direct current
Ig Superposition current
Io Resonant current
Is Current
L Inductor
R Resistor

The invention claimed is:

1. A direct-current switching device for switching a direct current, comprising:
a switching unit;
a resonant circuit;
an overvoltage arrester;
wherein, when said switching unit is switched off, said resonant circuit generates an oscillating resonant current being superposed on a direct current still flowing through said switching unit during a switching off;
said switching unit containing a series circuit formed of a first switching unit and a second switching unit connected in series with each other, said second switching unit having a switching behavior differing from that of said first switching unit, said resonant circuit and said arrester are connected electrically parallel to said series circuit;
a delay device which, when the direct current is switched off, opens said second switching unit at a time after said first switching unit;
a drive driving both said first and second switching units; and
said delay device contains a gearing mechanism or is formed of said gearing mechanism being connected between said second switching unit and said drive, a duration of delay of said delay device and a natural frequency of said resonant circuit are matched to one another such that a switching off of said second switching unit does not start until an amplitude of the oscillating resonant current has a value of at least 75% of the direct current that is to be switched off, and/or until after a period of time that is at least three times the natural frequency of said resonant circuit.

2. The direct-current switching device according to claim 1, wherein said first and second switching units have switching chambers, different switching behaviors of said first and second switching units are based on different physical effects in said switching chambers of said first and second switching units.

3. The direct-current switching device according to claim 1, wherein said first switching unit generates a larger arc voltage when the direct current is switched off than does said second switching unit.

4. The direct-current switching device according to claim 1, wherein said first switching unit is an insulating gas switching unit.

5. The direct-current switching device according to claim 1, wherein said second switching unit is configured in such a way that said second switching unit can switch currents with a steeper current gradient at a zero crossing than can said first switching unit.

6. The direct-current switching device according to claim 1, wherein said second switching unit is a vacuum switching unit.

7. The direct-current switching device according to claim 1,
wherein said delay device contains a snap-action spring mechanism or is formed of said snap-action spring mechanism that is connected between said second switching unit and said drive, said delay device is tightened during or after said first switching unit is switched off and is released to switch off said second switching unit.

8. The direct-current switching device according to claim 1, wherein the direct-current switching device is configured for switching direct currents in the kilo-ampere range.

9. A method for switching off a direct current, which comprises the steps of:
- switching-off a switching unit thus resulting in a generation of an arc, a resonant circuit being excited by an arc voltage occurring at the arc and an oscillating resonant current being generated which is superimposed on the direct current still flowing through a first switching unit during a switching off process, thus forming a superposition current;
- switching off the superposition current at a zero crossing of the superposition current, and energy stored in the resonant circuit being dissipated by an arrester;
- providing the switching unit with a series circuit of a first switching unit and a second switching unit whose switching behavior differs from that of the first switching unit, and the superposition current flowing through the series circuit of the first and second switching units is switched off at the zero crossing by the second switching unit;
- providing a delay device which, when the direct current is switched off, opens the second switching unit at a time after the first switching unit;
- providing a drive driving both the first and second switching units; and
- providing the delay device with a gearing mechanism being connected between the second switching unit and the drive, a duration of delay of the delay device and a natural frequency of the resonant circuit are matched to one another such that a switching off of the second switching unit does not start until an amplitude of the oscillating resonant current has a value of at least 75% of the direct current that is to be switched off, and/or until after a period of time that is at least three times the natural frequency of said resonant circuit.

10. The method according to claim 9, wherein the first switching unit generates a larger arc voltage when the direct current is switched off than does the second switching unit, and the second switching unit can switch oscillating currents with a steeper current gradient at the zero crossing than can the first switching unit.

11. The method according to claim 9, which further comprises opening the second switching unit with a delay after the first switching unit.

12. The method according to claim 11, wherein the switching off of the second switching unit does not start until an amplitude of the oscillating resonant current has a value of at least 75% of the direct current that is to be switched off, and/or until after a period of time that is at least three times a natural frequency of the resonant circuit.

13. The method according to claim 9,
which further comprises tightening a snap-action spring mechanism during or after the switching off of the first switching unit; and
wherein the second switching unit is switched off in that a tightened snap-action spring mechanism is released.

* * * * *